April 11, 1939.  C. ANDREWS ET AL  2,153,879
FLOUR SIFTER
Filed Aug. 20, 1934
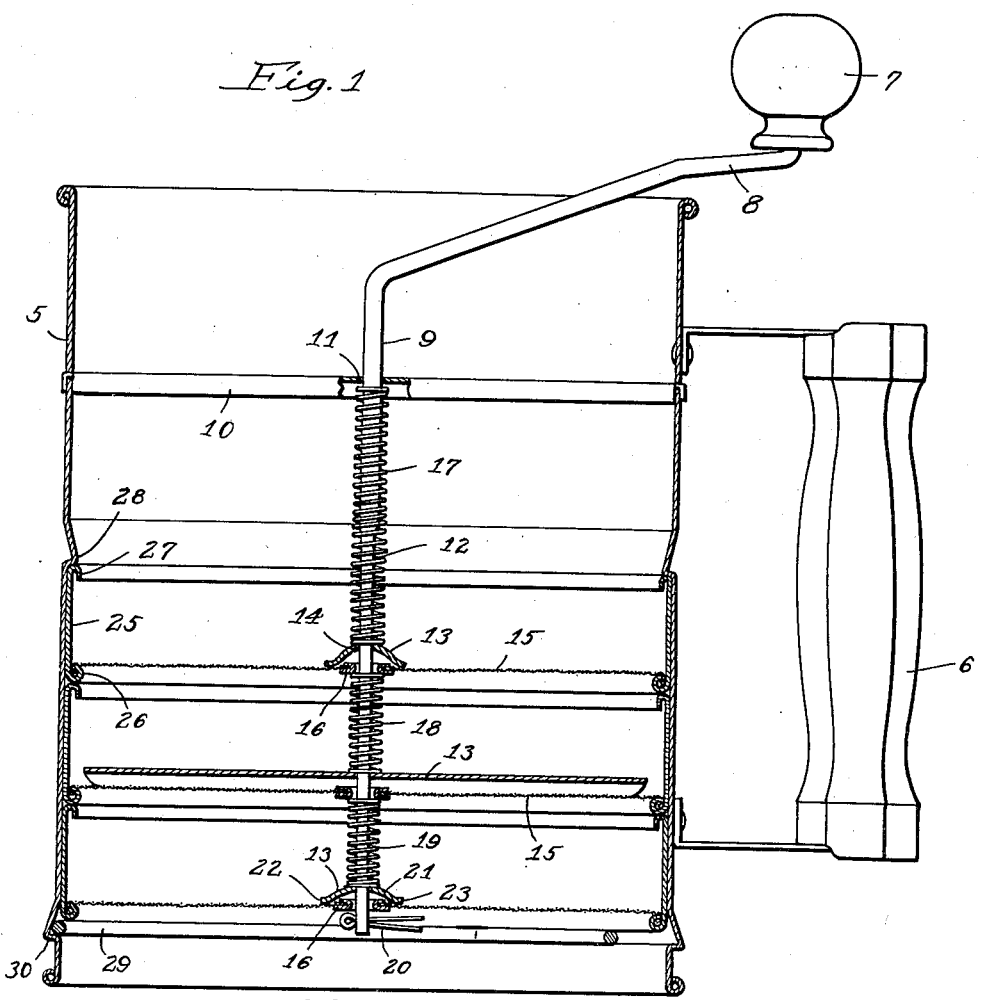
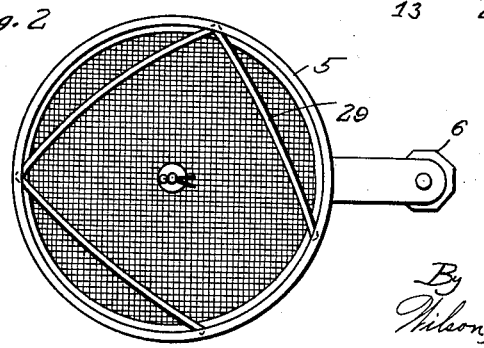
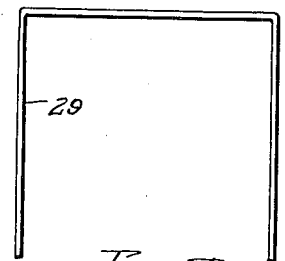
Inventors:
Charles Andrews &
Wilbur Hannon
By
Wilson, Lowell, McCanna & Wintercorn
Attys.

Patented Apr. 11, 1939

2,153,879

UNITED STATES PATENT OFFICE 2,153,879

FLOUR SIFTER

Charles Andrews and Wilbur Hannon, Rockford, Ill., assignors to The Washburn Company, Worcester, Mass., a corporation of Massachusetts Application August 20, 1934, Serial No. 740,607

2 Claims. (Cl. 209—358)

This invention relates to sifters generally, and more specifically a flour sifter for domestic use.

The principal object of our invention is to provide a flour sifter of simple and economical knockdown construction which operates more easily and quietly and still thoroughly sifts and mixes as well as properly aerates the material in one passage thereof through the sifter, the knockdown construction being of advantage not only in facilitating assembling at the factory, but also in permitting the device to be readily taken apart and put together again in the home whenever thorough cleaning is desired.

The invention is illustrated in the accompanying drawing, in which—

Figure 1 is a central vertical section through a flour sifter made in accordance with our invention;

Fig. 2 is a view on a smaller scale looking at the bottom of the sifter;

Fig. 3 is a plan view of one of the agitator bars, and

Fig. 4 is a similar view of the retaining spring wire appearing in Fig. 2.

The same reference numerals are applied to corresponding parts in these views.

The sifter comprises a generally conventional sheet metal body or container 5 of tubular form open at the top and bottom and having a handle 6 fastened to one side thereof. The handle is grasped with one hand while the sifter is operated by means of the knob 7 with the other hand, in the usual way. The knob 7 is rotatably mounted on a crank extension 8 of the rotary shaft 9 that extends vertically through the center of the container 5. A sheet metal cross-bar 10, made V-shape in cross-section for rigidity, is mounted in the container 5 near the top and has a center hole 11 through which the round portion of the shaft 9 extends. The lower portion of the shaft is flattened, as indicated at 12, to provide a driving connection with agitator bars 13, which have slots 14 provided therein, as indicated in Fig. 3, to fit non-rotatably on the shaft. The flat screens 15 have grommets or eyelets 16 provided therein at their centers where the shaft extends through. The shaft 9 also extends through three coiled compression springs 17, 18 and 19, the first being longer than the others and extending from the cross-bar 10 down to the uppermost bar 13 and the other two extending from the grommets on the screens down to the bars, whereby to hold the bars yieldingly in engagement with the screens. A cotter pin 20 is passed through a hole in the lower end of the shaft 9 to hold the shaft in place. The holes 14 in the bars 13 are purposely made large enough in relation to the portion 12 of the shaft 9 so that the bars will have enough play to align themselves with the screens 15 for most efficient sifting action. Then too, the fact that the springs 17, 18, and 19 bear centrally upon these bars and the bars extend diametrically with respect to the screens insures uniform pressure on the screens from end to end of the bars. Each bar is also assured of the proper tension because it has its individual spring to apply pressure thereon. These features in combination are considered to account for the easy and quiet operation of the sifter as well as its efficiency in the thorough mixing and sifting of the materials handled.

The agitator bars 13, it will be observed, are of sheet metal construction bent to channel-shaped cross-section so as to provide a raised central longitudinal portion 21 between the two longitudinal scrapping edges 22 and 23 that contact the screen. The bars are therefore shaped to bridge over the grommets 16 on the screens, so that they cannot interfere with the full length engagement of the bars with the screens. The channel-shaped cross-section is also of advantage in that it means increased rigidity and hence less likelihood of the bars getting bent out of a straight line. In that way, the full length engagement of the bars with the screens is further insured. The fact that each bar has two longitudinal edges in frictional engagement with the screen associated therewith further tends to increase the efficiency in sifting. The edges of the bars may be bent upwardly in a curve at the outer ends, as indicated at 24 in Fig. 3, to avoid catching on the wires of the screens in turning relative thereto. That naturally means less drag on the turning of the shaft and also less wear on the screens so that the sifter will give longer service.

Each screen 15, in accordance with our invention, is part of a separate sieve, the same being assembled in a separate sheet metal ring 25 made to fit slidably inside the container 5. The screen is clinched in the usual way by an inwardly curled lower edge 26 of the ring. The upper edge is also curled inwardly to define an annular shoulder on top similar to the annular shoulder defined at the bottom at 26. The several sieves are assembled in shoulder to shoulder relation in the container with the uppermost ring having its shoulder 27 in abutment with an annular internal shoulder 28 formed by an inwardly bent portion of the wall 5. In that way, the uppermost sieve is properly located in the container and the group of sieves is held against upward displacement from assembled position.

A retaining spring wire 29, generally U-shaped as shown in Fig. 4, is entered in an internal annular groove 30 provided in the bottom of the container by an outwardly bent portion of the wall thereof. The retaining wire is inserted in the groove bight portion first and then the free ends are bent inwardly toward each other sufficiently to snap into the groove, whereupon the sieves are held in place by reason of the engagement of the retaining wire with the bottom of the lowermost sieve. The construction just described is not only more economical than others with which we are familiar but is of advantage in that it insures firm support for the screens in true parallel relationship and spaced from one another a predetermined distance. It also enables quick and easy assembly with a consequent saving in cost of manufacture, and permits the user to easily take the device apart and put it together again in the event it is desired to clean, repair, or replace parts. The unitary construction of the sieves will, of course, permit replacement of one or more screens easily and economically should the occasion for it arise.

We claim:

1. In a flour sifter, the combination of an imperforate sheet metal cylindrical casing open at the top and bottom, a plurality of sifter units in superimposed relation in said casing each comprising a sheet metal ring fitting snugly inside the casing and of sufficient width to have enough bearing contact with the inside walls of the casing to insure positioning of the ring in a plane normal to the axis of the casing, and a flat screen stretched across one end of the ring and secured at its outer edges to the adjacent edge portion of the ring, the several rings being disposed edge to edge with the screens thereon in approximately equally spaced substantially parallel relation, an eyelet in the center of each screen projecting above the plane of the flat top thereof, the eyelets having circular holes provided therein and providing aligned shaft bearings, a shaft of polygonal cross-section adapted to pass freely through the openings in said eyelets and having means for rotating the same, a plurality of agitators each rotatably mounted upon one of said screens and having a central polygonal-shaped opening therein adapted for the free passage of the shaft longitudinally therethrough for driving connections with said shaft to rotate therewith, each of said agitators comprising a sheet metal bar formed generally to channel-shaped cross-section so as to provide two parallel screen-engaging longitudinal edge portions engaging the screen on opposite sides of the central eyelet which projects upwardly inside the channel-shaped portion of said agitator, and coiled compression springs on said shaft between the screens each with its upper end engaging the bottom of an eyelet and its lower end engaging the top of an agitator on the next screen below, said springs having the shaft extending freely therethrough longitudinally.

2. In a flour sifter having a casing and a plurality of sifter members inserted therein in stacked relation, each member forming a compartment wherein is mounted a screen, a plurality of agitators each rotatably mounted upon one of said screens and having a central polygonal-shaped opening therein adapted for the free passage of a shaft longitudinally therethrough and through registering central openings provided in the screens associated therewith, a shaft having a crank on its upper end for rotating the same and having a lower portion of polygonal-shaped cross-section adapted to pass freely through the openings in said agitators and screens, coiled compression springs compressed between the screens each with its upper end engaging the bottom of a screen and its lower end engaging on top of an agitator on the next screen below, said springs having the shaft extending freely therethrough longitudinally, a cross member in the upper portion of said casing having a central bearing provided thereon receiving the shaft rotatably, another coiled compression spring on the shaft engaging the cross-member at its upper end and exerting pressure at its lower end upon the agitator on the uppermost screen, and means for securing the shaft in assembled relation to the screens, agitators and springs, said shaft when rotated causing the simultaneous rotation of the agitators, each of said agitators comprising a sheet metal bar formed generally to channel-shaped cross-section so as to provide two parallel screen-engaging longitudinal edge portions, the four corners of each bar being bent upwardly so that the ends of the longitudinal edge portions will ride freely as a sled runner over the screen therebeneath.

CHARLES ANDREWS.
WILBUR HANNON.